US008023089B2

(12) United States Patent
Yeh

(10) Patent No.: US 8,023,089 B2
(45) Date of Patent: Sep. 20, 2011

(54) DELTA TYPE PIXEL ARRAY AND DISPLAY PANEL USING THE SAME

(75) Inventor: Yih-Yuan Yeh, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 977 days.

(21) Appl. No.: 11/938,796

(22) Filed: Nov. 13, 2007

(65) Prior Publication Data

US 2008/0117154 A1 May 22, 2008

(30) Foreign Application Priority Data

Nov. 22, 2006 (TW) .............................. 95143159 A

(51) Int. Cl.
*G02F 1/1343* (2006.01)

(52) U.S. Cl. ......................... 349/145; 345/103; 349/139

(58) Field of Classification Search .................. 349/143, 349/145; 345/90, 103
See application file for complete search history.

(56) References Cited

U.S. PATENT DOCUMENTS

2006/0132668 A1 * 6/2006 Park et al. ...................... 349/48
2009/0040403 A1 * 2/2009 Ong ................................ 349/37

FOREIGN PATENT DOCUMENTS

CN 1731503 2/2006
CN 1779766 5/2006

* cited by examiner

*Primary Examiner* — Nathanael R Briggs
(74) *Attorney, Agent, or Firm* — Jianq Chyun IP Office

(57) ABSTRACT

A pixel array and a display panel with the pixel array are provided. The number of the scan lines used in the pixel array is reduced to half, while the number of data lines is doubled because every two sub-pixel rows correspond to one scan line in the pixel array. The wire impedances between the data lines and the pixel array are thus made the same. The aperture ratio of each sub-pixel is thereby increased and the size of the TFT in each sub-pixel is also reduced. The complexity in the wire arrangement of the pixel array is accordingly lowered to improve the transmittance of the display panel and make the frame resolution of the display panel more even.

14 Claims, 7 Drawing Sheets

DELTA TYPE PIXEL ARRAY AND DISPLAY PANEL USING THE SAME

CROSS-REFERENCE TO RELATED APPLICATION

This application claims the priority benefit of Taiwan application serial no. 95143159, filed on Nov. 22, 2006. All disclosure of the Taiwan application is incorporated herein by reference.

BACKGROUND OF THE INVENTION

1. Field of the Invention

The present invention relates to a display panel, and especially to the pixel layout of a pixel array and a display panel applying the same.

2. Description of Related Art

FIG. 1 is a schematic diagram of a conventional liquid crystal display. The liquid crystal display 100 includes a display panel 101 having a delta type pixel array, a plurality of data lines DL, and a plurality of scan lines GL disposed thereon. Referring to FIG. 1, the sub-pixels of the first and the last sub-pixel rows are not disposed on the same shaft. Hence, the wire arrangement of the data lines in the display panel 101 is in a step-type arrangement. Each of the data lines DL in the display panel 101 is correspondingly coupled to one of source lines of a source driver 103.

The sub-pixels disposed on the same shaft in the delta type pixel (such as the sub-pixels SP1 and SP2 shown in FIG. 1) are electrically connected to different data lines DL. Therefore, the wire lengths of the data lines DL corresponding to the sub-pixel SP3 in the second sub-pixel row and the sub-pixel SP4 in the last sub-pixel row within an area A have to be increased, in order to electrically connect the corresponding source line of the source driver 103. The wire lengths between the delta type pixel array and the data lines DL in the display panel 101 are thus different. As a result, the wire impedance of each of the data lines DL is different and the frame resolution of the display 100 is uneven.

It is noted that the wire lengths of the data lines DL corresponding to the sub-pixel SP3 in the second sub-pixel row and the sub-pixel SP4 in the last sub-pixel row on the left side of the display panel 101 have to be increased to connect with the corresponding source lines of the source driver 103, and thus the space for the wire arrangement around the delta type pixel array in the display panel 101 is enlarged. Due to the complexity of the wire arrangement between the delta type pixel array and the data lines DL in the display panel 101 is increased, so the manufacture process will be difficult and decreased production yield.

Furthermore, the sub-pixels on the same row in the delta type pixel array of the display panel 101 are electrically connected to different data lines DL in the display panel 101. Hence, the number of the source lines of the source driver 103 has to be increased, such that the number of the source lines of the source driver 103 is the same as the number of the data lines DL in the display panel 101. However, since as many source lines of the drivers 103 as the data lines DL are used in the display panel 101, additional production costs are introduced.

It is further noted that in the delta type pixel array of the conventional display panel 101, each sub-pixel row has to be electrically connected with one scan line GL to receive a scan voltage (Vscan) outputted by a gate driver 105, in order to enable the thin film transistors (TFTs) in the sub-pixel row. In addition, in order to increase the charge efficiency of the TFT of each sub-pixel in each sub-pixel row, the size of the TFT is increased, while the aperture ratio of the sub-pixel is reduced and the transmittance of the display panel 101 is decreased accordingly.

SUMMARY OF THE INVENTION

In view of the above, the present invention provides a pixel array, wherein every two sub-pixel rows correspond to one scan line, in order to decrease the number of the scan lines used in the display panel. Furthermore, the number of the data lines is doubled to render the wire impedances between the data lines and the pixel array becoming the same.

The invention further provides a display panel, which utilizes the aforementioned pixel array to provide a more even displaying frame.

As mentioned and broadly described herein, the invention provides a pixel array including a first scan line, a second scan line and a plurality of data lines. The first scan line is electrically connected with the first sub-pixel row and the second sub-pixel row. The second scan line is electrically connected with the third sub-pixel row and the fourth sub-pixel row. Every two adjacent sub-pixel rows of the first sub-pixel row, the second sub-pixel row, the third sub-pixel row and the fourth sub-pixel row are staggered. A plurality of data lines is divided into a first group and a second group, wherein the first group is electrically connected with the first sub-pixel row and the third sub-pixel row, and the second group is electrically connected with the second sub-pixel row and the fourth sub-pixel row.

The invention also provides a pixel array including a first scan line, a second scan line and a plurality of data lines. The first scan line is electrically connected with the first sub-pixel row and the second sub-pixel row. The second scan line is electrically connected with the third sub-pixel row and the fourth sub-pixel row. Every two adjacent sub-pixel rows of the first sub-pixel row, the second sub-pixel row, the third sub-pixel row and the fourth sub-pixel row are staggered. A plurality of data lines is divided into a first group, a second group, a third group, a fourth group, a fifth group and a sixth group. The first, third and fifth groups are electrically connected with the first and the third sub-pixel rows. The second, fourth and sixth groups are electrically connected with the second and the fourth sub-pixel rows.

The invention further provides a display panel featuring a pixel array including a first scan line, a second scan line and a plurality of data lines. The first scan line is electrically connected with the first sub-pixel row and the second sub-pixel row. The second scan line is electrically connected with the third sub-pixel row and the fourth sub-pixel row. Every two adjacent sub-pixel rows of the first sub-pixel row, the second sub-pixel row, the third sub-pixel row and the fourth sub-pixel row are staggered. A plurality of data lines is divided into a first group and a second group. The first group is electrically connected with the first sub-pixel row and the third sub-pixel row, and the second group is electrically connected with the second sub-pixel row and the fourth sub-pixel row.

The invention also provides a display panel featuring a pixel array including a first scan line, a second scan line and a plurality of data lines. The first scan line is electrically connected with the first sub-pixel row and the second sub-pixel row. The second scan line is electrically connected with the third sub-pixel row and the fourth sub-pixel row. Every two adjacent sub-pixel rows of the first sub-pixel row, the second sub-pixel row, the third sub-pixel row and the fourth sub-pixel row are staggered. A plurality of data lines is divided into a first group, a second group, a third group, a fourth group, a fifth group and a sixth group. The first, third and fifth groups are electrically connected with the first and the third sub-pixel rows. The second, fourth and sixth groups are electrically connected with the second and the fourth sub-pixel rows.

The pixel array provided by the present invention is utilized in the liquid crystal display (LCD) and the LCD panel thereof. Given that every two sub-pixel rows correspond to one scan line in the pixel array, the load of driving the display panel for the gate driver is lessened, and the overall power consumption in the display panel is reduced. Furthermore, every two sub-pixel row must correspond to one scan line, and when the scan drivers send out the scan signals to two sub-pixels, the pixel performance on the display speed is also increased as increasing the LC response time at same time.

Additionally, since the number of the scan lines disposed in the pixel array is reduced by one half, some space for the wire arrangement in the pixel array is saved, the charge efficiency of the TFT of each sub-pixel is improved and the design of the TFT is accordingly simplified. Moreover, the aperture ratio of each sub-pixel in the pixel array is also increased and the transmittance of the display panel is improved. Moreover, by using the arrangement of the data lines in the pixel array of the invention, not only is the complexity in the wire arrangement in the pixel array reduced, but the wire impedances between the data lines and the pixel array are also rendered the same, such that the displaying frame of the LCD panel is more uniform and the display quality of the LCD display using the pixel array is also elevated.

In order to make the aforementioned and other objects, features and advantages of the present invention more comprehensible, some preferred embodiments accompanied with figures are described in detail below.

DESCRIPTION OF EMBODIMENTS

The First Embodiment

Figure 1:
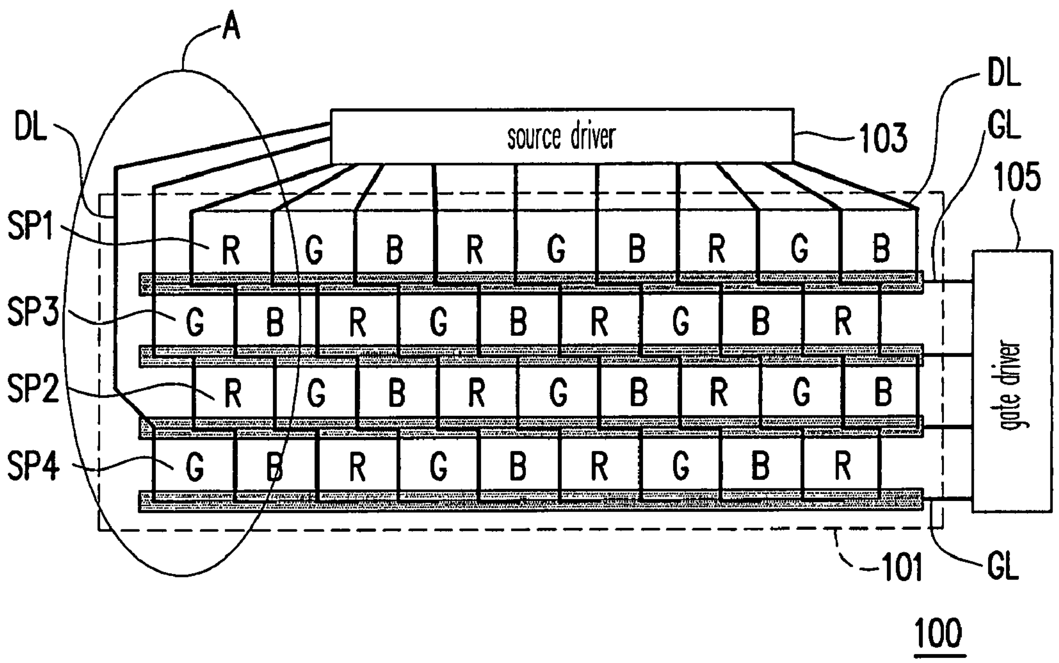
FIG. 1 (PRIOR ART)
FIG. 1 is a schematic diagram of a conventional LCD display using a delta type pixel array in its display panel showing the wire arrangement between the data lines and the scan lines in the display panel.
Figure 2:
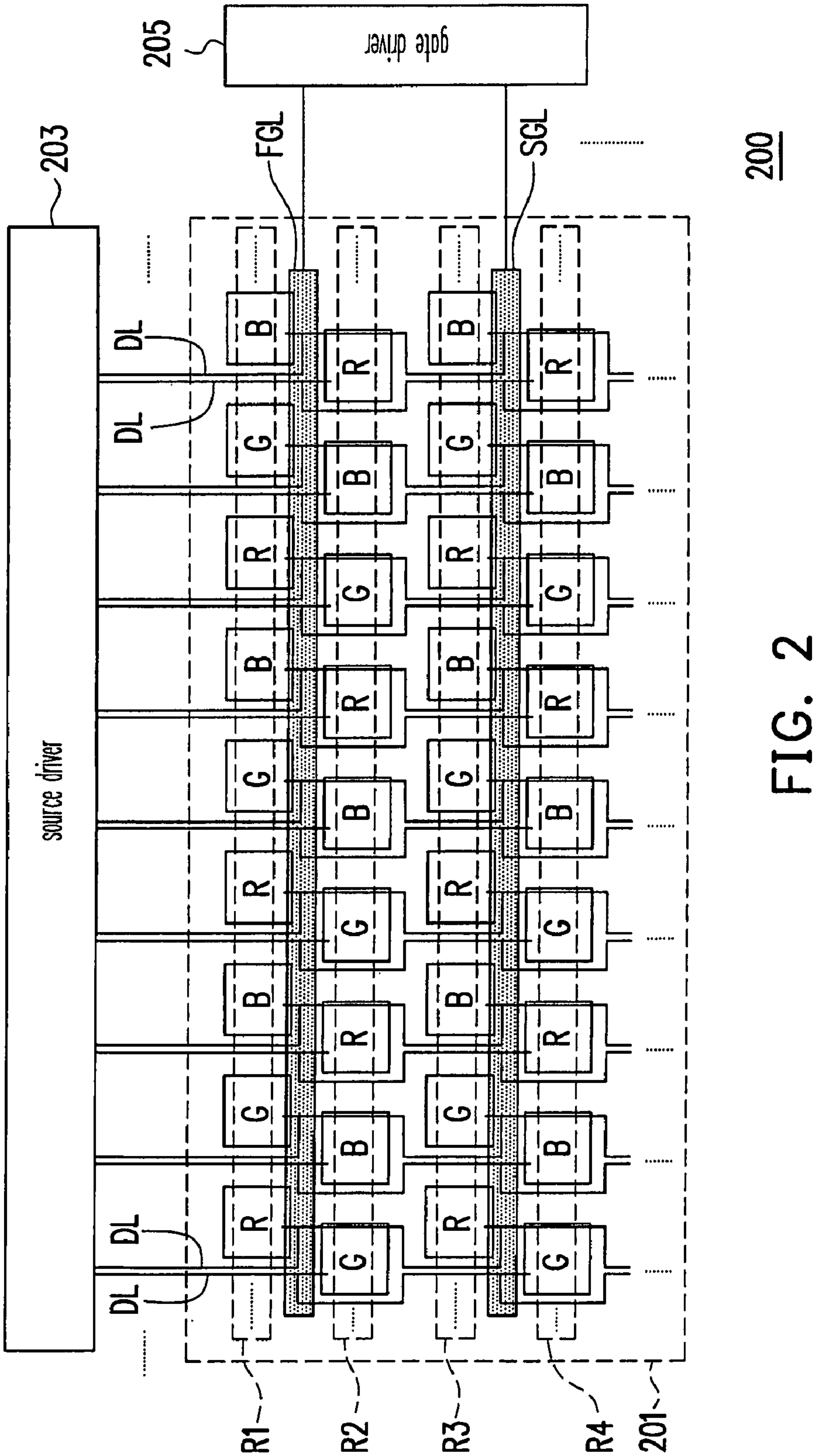
FIG. 2 illustrates a display according to the first embodiment of the present invention.

FIG. 2 illustrates a display according to a first embodiment of the invention. The display 200 may be any of known flat displays, such as an LCD or a plasma display panel (PDP). Referring to FIG. 2, the display 200 is taken as an LCD display for an example, wherein the display 200 includes a display panel 201, a source driver 203, and a gate driver 205. The display panel 201 includes a pixel array, a first scan line FGL, a second scan line SGL and a plurality of data lines DL disposed on a substrate (not shown). In the first embodiment, the first scan line FGL is electrically connected with the first sub-pixel row R1 and the second sub-pixel row R2, and second scan line SGL is electrically connected with the third sub-pixel row R3 and the fourth sub-pixel row R4. The sub-pixels in adjacent sub-pixel rows among the sub-pixel rows R1-R4 are staggered in order to form a delta type pixel array.

A plurality of data lines DL in the pixel array of the display panel 201 is divided into a first group and a second group. Each data line DL of the first group goes along the left side of each sub-pixel in the first sub-pixel row R1, circles rightward under the sub-pixel in the first sub-pixel row R1 and electrically connects with the sub-pixel. Furthermore, the data line DL goes along the right side of a corresponding sub-pixel in the adjacent staggered second sub-pixel row R2 and circles leftward under the said sub-pixel. Then, the data line DL goes further along the left side of another corresponding sub-pixel in the adjacent staggered third sub-pixel row R3, circles rightward under the said sub-pixel and electrically connects with the sub-pixel.

Each data line DL of the second group goes along the right side of each sub-pixel in the first sub-pixel row R1, circles leftward under the said sub-pixel and electrically connects with a corresponding sub-pixel in the adjacent staggered second sub-pixel row R2. Furthermore, the data line DL goes along the left side of the said sub-pixel in the second sub-pixel row R2 and circles rightward under the sub-pixel. Then, the data line DL goes further along the right side of another corresponding sub-pixel in the adjacent staggered third sub-pixel row R3, circles leftward under the said sub-pixel and electrically connects with yet another corresponding sub-pixel in the fourth sub-pixel row R4.

It can be inferred from the foregoing that the data lines DL of the first group are electrically connected with one source line from the source driver 203 to receive a data voltage outputted by the source driver 203 and supply the data voltage to the sub-pixels in the first sub-pixel row R1 and the third sub-pixel row R3. The data lines DL of the second group are also electrically connected with one source line from the source driver 203 to receive a data voltage outputted by the source driver 203 and supply the data voltage to the sub-pixels in the second sub-pixel row R2 and the fourth sub-pixel row R4.

In the first embodiment, the first sub-pixel row R1 and the second sub-pixel row R2 correspond to the first scan line FGL. When a gate line of a gate driver 205 outputs a scan voltage to the first scan line FGL, the TFTs (not shown) of the sub-pixels in the first sub-pixel row R1 and the second sub-pixel row R2 are simultaneously enabled in order to receive the data voltage outputted by the source driver 203. Likewise, the third sub-pixel row R3 and the fourth sub-pixel row R4 correspond to the second scan line SGL. When a scan voltage outputted by a gate line from the gate driver 205, the TFTs of the sub-pixels in the third sub-pixel row R3 and the fourth sub-pixel row R4 are simultaneously enabled to receive correspondingly the data voltage outputted by the source driver 203.

Figure 3:
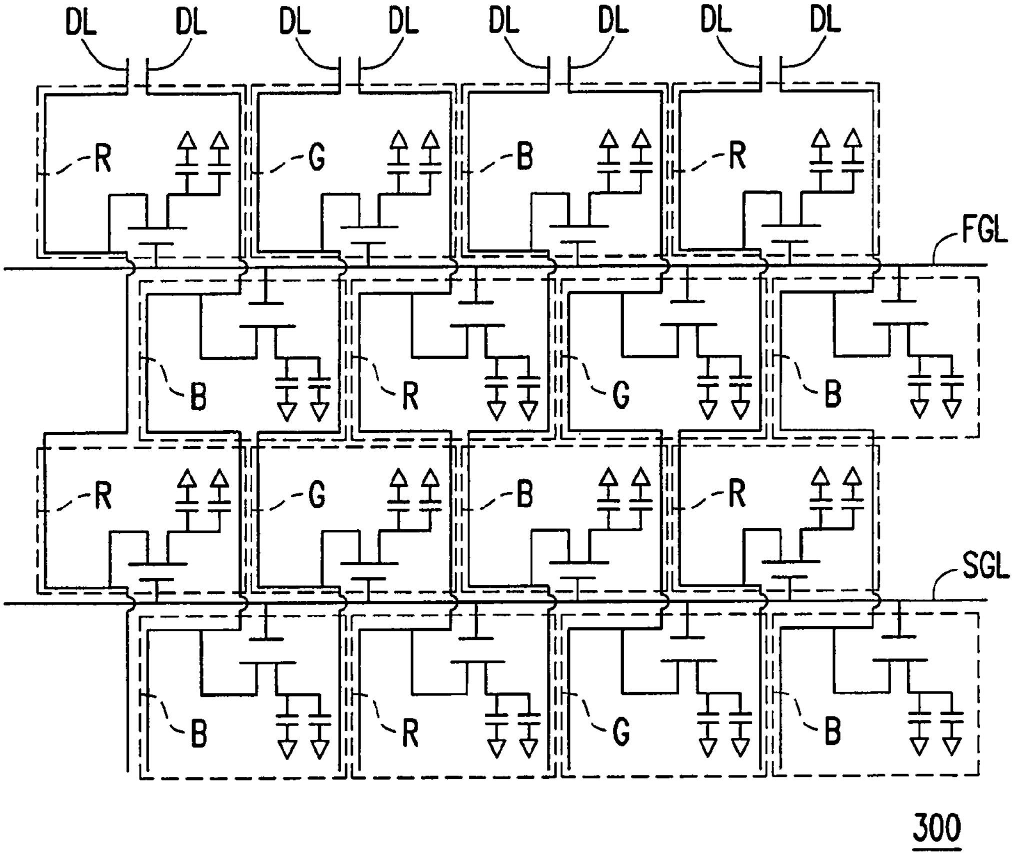
FIG. 3 shows a circuit diagram of the pixel array of a display panel according to the first embodiment of the invention.

FIG. 3 shows a circuit diagram of the pixel array of the display panel 201 according to the first embodiment of the invention. Referring to both FIGS. 2 and 3, the circuit 300 shows that since every two sub-pixel rows in the pixel array correspond to one scan line in the display panel 201, the TFTs of the sub-pixels in the two sub-pixel rows corresponding to the scan line are upside down and staggered. Since the first embodiment featured in the wire arrangement of the pixel array of the display panel 201, the driving technique of the display panel 201, which is well known to those ordinarily skilled in the art, is omitted and will not be reiterated in the following.

In the first embodiment, the four sub-pixel rows R1-R4 are taken as examples. However, those ordinarily skilled in the art should be able to infer a pixel array consisted of more sub-pixel rows from the foregoing description, and the details thereof are hence omitted.

It is noted from the electrical connection of the pixel array of the display panel 201 as disclosed in FIG. 2 that the data lines DL of the first group and those of the second group are in parallel, and perpendicular to the first scan line FGL and the second scan line SGL. Additionally, due to the right-left mirror arrangement of the data lines DL and the same impedance among the corresponding data lines DL (i.e. uniform impedance), the complexity in the wire arrangement of the pixel array in the display panel 201 is reduced, and the displaying frame of the display panel 201 is more even, such that the frame quality of the display panel 200 using the pixel array 201 is elevated.

Given that the first sub-pixel row R1 and the second sub-pixel row R2 correspond to the first scan line FGL, and the third sub-pixel row R3 and the fourth sub-pixel row R4 correspond to the second scan line SGL, it can be inferred that the number of the scan lines used in the pixel array of the display panel 201 is reduced by one half compared with the number of the scan lines used in the pixel array of the conventional display panel in the prior art. Because the loading of gate driver 205 is reduced, the overall power consumption of the display panel 201 will be reduced. Furthermore, every two sub-pixel rows correspond to one scan line and the scanning time of the display panel 201 has to be prolonged. As a result, the response time of each sub-pixel in the pixel array of the display panel 201 is also shortened.

In view of the above, for the same reasons, some space of the wire arrangement of the pixel array in the display panel 201 is saved, and the size of the TFT of each sub-pixel in the pixel array of the display panel 201 is also reduced. The aperture ratio of each sub-pixel in the pixel array of the display panel 201 is accordingly increased in order to improve the transmittance of the display panel 201 and the charge efficiency of the TFT of each sub-pixel in the pixel array of the display panel 201 (namely, the efficiency of charging a storage capacitance of the sub-pixel).

The Second Embodiment

Figure 4:
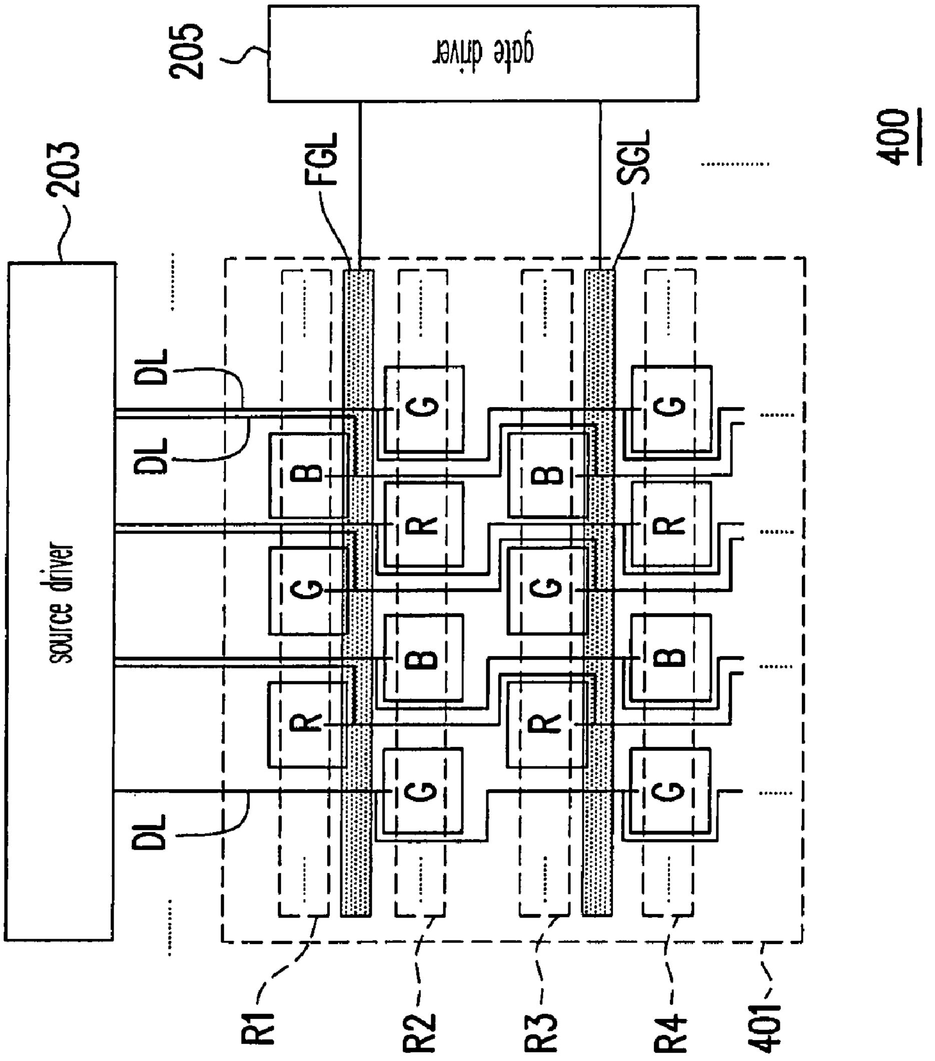
FIG. 4 illustrates a display according to the second embodiment of the invention.

FIG. 4 illustrates a display 400 according to the second embodiment of the present invention. Referring to both FIGS. 2 and 4, the difference between the display 400 and the display 200 is that the wire arrangements of the first and the second groups of data lines DL in the display panel 401 in FIG. 4 differ from the wire arrangements of the data lines DL in the display panel 201 in FIG. 2.

In the second embodiment, each data line DL of the first group goes along the right side of each sub-pixel in the first sub-pixel row R1, circles leftward under the said sub-pixel in the first sub-pixel row R1 and electrically connects with the sub-pixel. Furthermore, the data line DL goes along the left side of a corresponding sub-pixel in the adjacent staggered second sub-pixel row R2 and circles rightward under the said sub-pixel. Then, the data line DL goes further along the right side of another corresponding sub-pixel in the adjacent staggered third sub-pixel row R3, circles leftward under the said sub-pixel in the third sub-pixel row R3 and electrically connects with the sub-pixel.

Each data line DL of the second group goes along the right side of each sub-pixel in the first sub-pixel row R1, circles leftward under the said sub-pixel in the first sub-pixel row R1 and electrically connects with a corresponding sub-pixel in the adjacent staggered second sub-pixel row R2. Furthermore, the data line DL goes along the left side of the said sub-pixel in the second sub-pixel row R2 and circles rightward under the sub-pixel. Then, the data line DL goes further along the right side of another corresponding sub-pixel in the adjacent staggered third sub-pixel row R3, circles leftward under the said sub-pixel and electrically connects with yet another corresponding sub-pixel in the fourth sub-pixel row R4.

Figure 5:
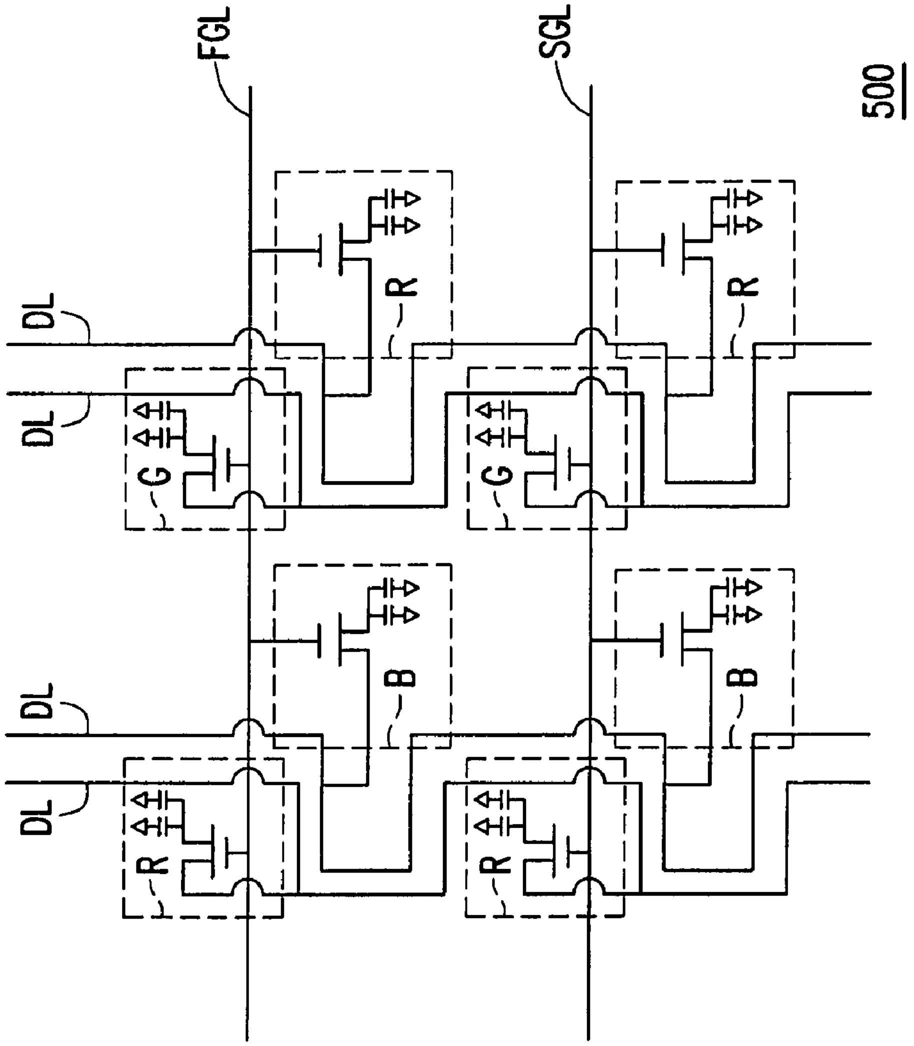
FIG. 5 shows a circuit diagram of a pixel array of a display panel according to the first embodiment of the invention.

FIG. 5 is a circuit diagram 500 showing the pixel array of the display panel 401 according to the second embodiment of the invention. Given that every two sub-pixel rows in the pixel array of the display panel 401 correspond to one scan line, the TFT of each sub-pixel in the two sub-pixel rows corresponding to the scan line appears upside down and staggered. Since the second embodiment featured in the wire arrangement of the pixel array of the display panel 401, the driving method of the display panel 401, which is well known to those ordinarily skilled in the art, is omitted.

The Third Embodiment

Figure 6:
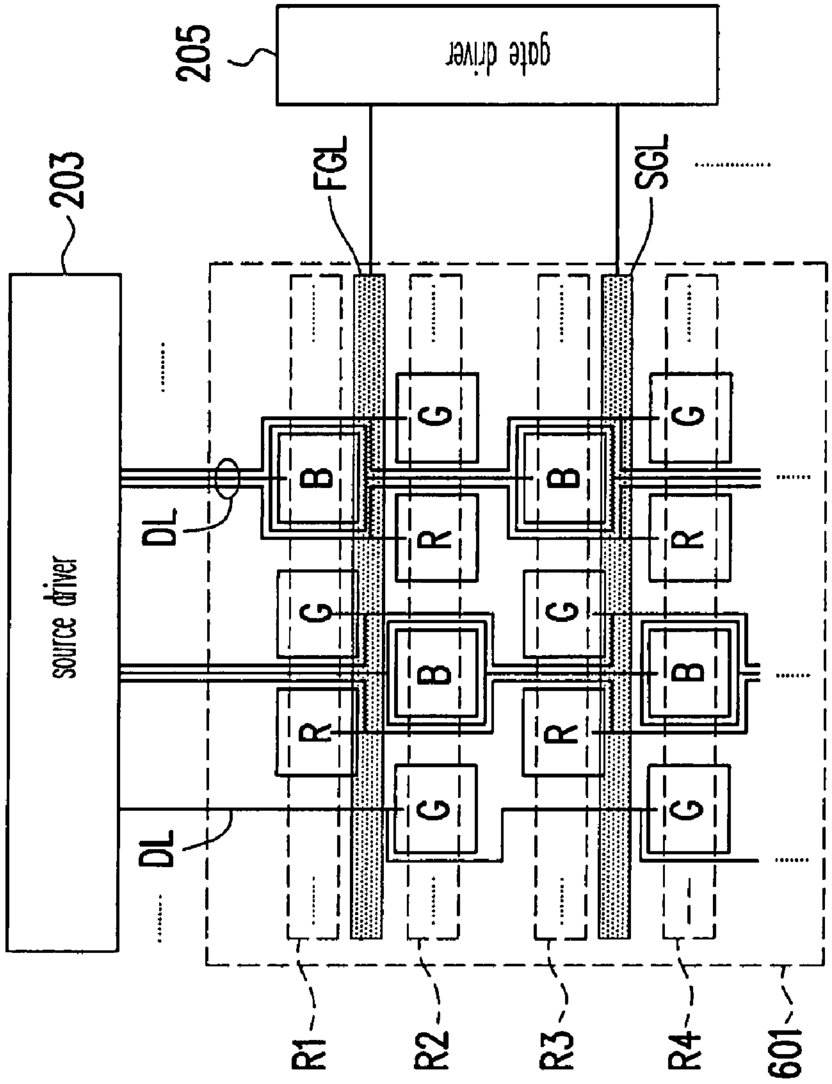
FIG. 6 illustrates a display according to the third embodiment of the present invention.

FIG. 6 illustrates a display 600 according to the third embodiment of the present invention. Referring to both FIGS. 2 and 6, the most significant difference between a display 600 and the display 200 is that the data lines DL of the pixel array in a display panel 601 of the display 600 are divided into six groups and that the wire arrangements of the data lines DL in the pixel array of the display panel 601 also differ from the wire arrangements of the data lines DL in the pixel array of the display panel 201. However, the desired effects and the technical problems to be solved of the display panel 600 are the same as those of the display 200.

In the third embodiment, each data line DL of the first group goes along the right side of a corresponding sub-pixel in the first sub-pixel row R1, circles leftward under the said sub-pixel in the first sub-pixel row R1 and electrically connects with the sub-pixel. Furthermore, the data line DL goes along the left side of another corresponding sub-pixel in the adjacent staggered second sub-pixel row R2 and circles rightward under the said sub-pixel. Then, the data line DL goes further along the right side of yet another corresponding sub-pixel in the adjacent staggered third sub-pixel row R3, circles leftward under the said sub-pixel in the third sub-pixel row R3 and electrically connects with the sub-pixel.

Each data line DL of the second group goes along the right side of a corresponding sub-pixel in the first sub-pixel row R1, circles both rightward and leftward around another corresponding sub-pixel in the adjacent staggered second sub-pixel row R2 and electrically connects with the said sub-pixel. Then, the data line DL goes along the right side of another corresponding sub-pixel in the adjacent staggered third sub-pixel row R3, circles both rightward and leftward around yet another sub-pixel in the adjacent staggered fourth sub-pixel row R4 and electrically connects with the said sub-pixel.

Each data line DL of the third group goes along the left side of a corresponding sub-pixel in the first sub-pixel row R1, circles rightward under the said sub-pixel in the first sub-pixel row R1 and electrically connects with the sub-pixel. Furthermore, the data line DL goes along the right side of another corresponding sub-pixel in the adjacent staggered second sub-pixel row R2 and circles leftward under the said sub-pixel. Then, the data line DL goes further along the left side of yet another corresponding sub-pixel in the adjacent staggered third sub-pixel row R3, circles rightward under the said sub-pixel in the third sub-pixel row R3 and electrically connects with the sub-pixel.

Each data line DL of the fourth group starts from over a corresponding sub-pixel in the first sub-pixel row R1, circles leftward under the said sub-pixel in the first sub-pixel row R1 and electrically connects with another corresponding sub-pixel in the adjacent staggered second sub-pixel row R2. Furthermore, the data line DL goes along the right side of the said sub-pixel in the second sub-pixel row R2 and circles leftward under the sub-pixel. Then, the data line DL goes further along the left side of another corresponding sub-pixel in the adjacent staggered third sub-pixel row R3, circles rightward under the sub-pixel and electrically connects with yet another sub-pixel in the fourth sub-pixel row R4.

Each data line DL of the fifth group surrounds a corresponding sub-pixel in the first sub-pixel row R1 and electrically connects with the said sub-pixel. Furthermore, the data line DL goes along the right side of another corresponding sub-pixel in the adjacent staggered second sub-pixel row R2, circles both rightward and leftward around yet another corresponding sub-pixel in the adjacent staggered third sub-pixel row R3 and electrically connects with the said sub-pixel.

Each data line DL of the sixth group starts from over a corresponding sub-pixel in the first sub-pixel row R1, circles rightward under the said sub-pixel in the first sub-pixel row R1 and electrically connects with another corresponding sub-pixel in the adjacent staggered second sub-pixel row R2. Furthermore, the data line DL continues going along the left side of the said sub-pixel in the second sub-pixel row R2 and circles rightward under the sub-pixel. Then, the data line DL goes further along the right side of another corresponding sub-pixel in the adjacent staggered third sub-pixel row R3, circles leftward under the said sub-pixel in the third sub-pixel row R3 and electrically connects with yet another sub-pixel in the fourth sub-pixel row R4.

It is noted that the data lines DL of the second group and the fifth group in the third embodiment circle around the corresponding sub-pixels, which is likely to reduce the aperture ratio of the sub-pixels. In the third embodiment, the corresponding sub-pixels circled by the data lines DL of the second group and the fifth group utilize color filters of brighter colors to compensate for this weakness. The corresponding sub-pixels circled by the data lines DL of the other groups, i.e. the first, third, fourth and sixth groups, on the other hand, utilize color filters of less bright colors. The shades of colors are thus balanced to solve the problem of the third embodiment.

Figure 7:
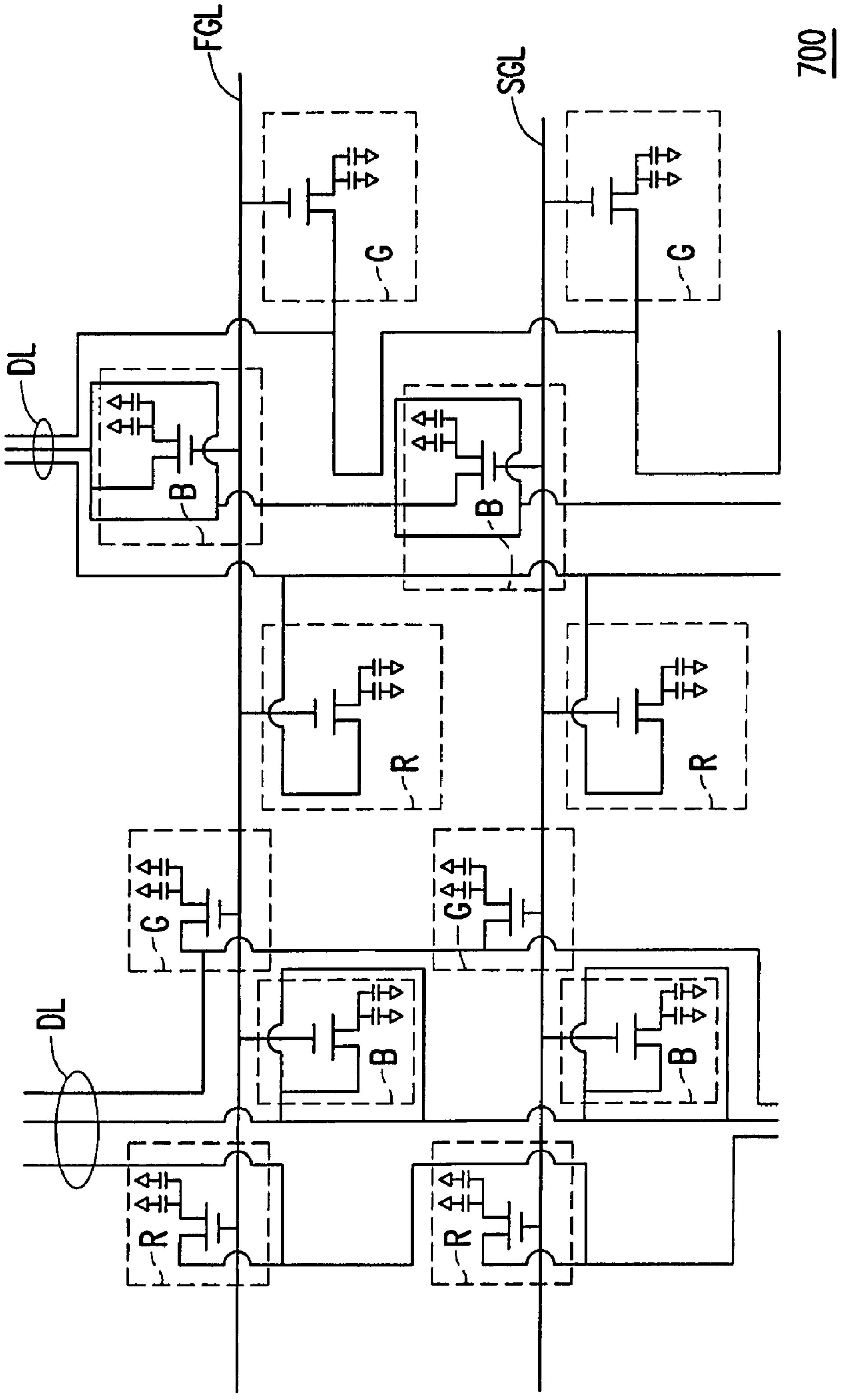
FIG. 7 shows a circuit diagram of a pixel array of a display panel according to the third embodiment of the invention.

FIG. 7 is a circuit diagram 700 showing the pixel array of the display panel 601 according to the third embodiment of the invention. Given that every two sub-pixel rows of the pixel array in the display panel 601 correspond to one scan line, the TFTs of the sub-pixels in the two sub-pixel rows corresponding to the scan line appear upside down and staggered. Since the third embodiment featured in the wire arrangement of the pixel array of the display panel 601, the driving technique of the display panel 601, which is well known to those ordinarily skilled in the art, is omitted.

In summary, the present invention provides a pixel array used in the current LCD and the LCD panel thereof. According to the spirit of the present invention, the present invention has at least the following advantages.

1. Every two sub-pixel rows correspond to one scan line. Therefore, the load of driving the display panel for the gate driver is lessened, which reduces the overall power consumption of the display panel in order to prevent the display panel from being influenced by the heat and high resistance from high power consumption. Further, the scanning time of the display panel thus has to be increased, such that the response time of each sub-pixel in the pixel array of the display panel is also shortened.

2. The number of the scan lines used in the pixel array is reduced by one half; therefore, some space for the wire arrangement in the pixel array is saved. In addition, the size of the TFT of each sub-pixel in the pixel array is reduced. The aperture ratio of each sub-pixel in the pixel array is accordingly increased and the transmittance of the display panel and the charge efficiency of the TFTs are also improved.

3. By using the arrangement of the data lines in the pixel array, the present invention not only reduce the complexity in the wire arrangement of the pixel array, but also renders the wire impedances between the data lines and the pixel array the same. The displaying frame of the LCD panel is thus more even and the display quality of the LCD display using the pixel array is also elevated.

Although the present invention has been disclosed above by the preferred embodiments, they are not intended to limit the present invention. Anybody skilled in the art can make some modifications and alteration without departing from the spirit and scope of the present invention. Therefore, the protecting range of the present invention falls in the appended claims.

What is claimed is:

1. A pixel array having a plurality of sub-pixel rows, comprising:

a first scan line electrically connected with a first sub-pixel row and a second sub-pixel row;

a second scan line electrically connected with a third sub-pixel row and a fourth sub-pixel row, wherein every two adjacent sub-pixel rows of the first sub-pixel row, the second sub-pixel row, the third sub-pixel row and the fourth sub-pixel row are staggered; and a plurality of data lines divided into a first group and a second group, wherein the first group is only electrically connected with the first and the third sub-pixel rows, and the second group is only electrically connected with the second and the fourth sub-pixel rows.

2. The pixel array as claimed in claim 1, wherein each data line of the first group goes along the left side of each sub-pixel in the first sub-pixel row, circling rightward under the said sub-pixel, going along the right side of a corresponding sub-pixel in the second sub-pixel row and circling leftward under the sub-pixel, continuing going along the left side of another corresponding sub-pixel in the third sub-pixel row and circling rightward under the said sub-pixel, each data line of the second group going along the right side of each sub-pixel of the first sub-pixel row and circling leftward under the said sub-pixel, continuing going along the left side of a corresponding sub-pixel in the second sub-pixel row and circling rightward under the said sub-pixel, going further along the right side of yet another corresponding sub-pixel in the third sub-pixel row and circling leftward under the said sub-pixel.

3. The pixel array as claimed in claim 1, wherein each data line of the first group goes along the right side of each sub-pixel in the first sub-pixel row, circling leftward under the said sub-pixel, going along the left side of a corresponding sub-pixel in the second sub-pixel row and circling rightward under the sub-pixel, continuing going along the right side of another corresponding sub-pixel in the third sub-pixel row and circling leftward under the sub-pixel, each data line of the second group going along the right side of each sub-pixel in the first sub-pixel row and circling leftward under the said sub-pixel, continuing going along the left side of a corresponding sub-pixel in the second sub-pixel row and circling rightward under the said sub-pixel, going further along the right side of another corresponding sub-pixel in the third sub-pixel row and circling leftward under the said sub-pixel.

4. The pixel array as claimed in claim 1, wherein the data lines are parallel to one another and perpendicular to the first and the second scan lines.

5. A pixel array having a plurality of sub-pixel rows, comprising:

a first scan line electrically connected with a first sub-pixel row and a second sub-pixel row;

a second scan line electrically connected with a third sub-pixel row and a fourth sub-pixel row, wherein every two adjacent sub-pixel rows of the first sub-pixel row, the second sub-pixel row, the third sub-pixel row and the fourth sub-pixel row are staggered; and a plurality of data lines divided into a first group, a second group, a third group, a fourth group, a fifth group and a sixth group, wherein the first, third and fifth groups are only electrically connected with the first and the third sub-pixel rows, and the second, fourth and sixth groups are only electrically connected with the second and the fourth sub-pixel rows.

6. The pixel array as claimed in claim 5, wherein each data line of the first group goes along the right side of a corresponding sub-pixel in the first sub-pixel row, circling leftward under the said sub-pixel, continuing going along the left side of another corresponding sub-pixel in the second sub-pixel row and circling under the said sub-pixel, going further along the right side of yet another corresponding sub-pixel in the third sub-pixel row and circling leftward under the said sub-pixel.

7. The pixel array as claimed in claim 5, wherein each data line of the second group goes along the right side of a corresponding sub-pixel in the first sub-pixel row, circling both rightward and leftward around another corresponding sub-pixel in the second sub-pixel row, continuing going along the right side of another corresponding sub-pixel in the third sub-pixel row, circling both rightward and leftward around yet another corresponding sub-pixel in the fourth sub-pixel row.

8. The pixel array as claimed in claim 5, wherein each data lines of the third group goes along the left side of a corresponding sub-pixel in the first sub-pixel row, circling rightward under the said sub-pixel, continuing going along the right side of another corresponding sub-pixel in the second sub-pixel row and circling leftward under the said sub-pixel, going further along the left side of yet another corresponding sub-pixel in the third sub-pixel row and circling rightward under the said sub-pixel.

9. The pixel array as claimed in claim 5, wherein each data line of the fourth group starts from over a corresponding sub-pixel in the first sub-pixel row and circling leftward under the said sub-pixel, continuing going along the right side of another corresponding sub-pixel in the second sub-pixel row and circling leftward under the said sub-pixel, going further along the left side of yet another corresponding sub-pixel in the third sub-pixel row and circling rightward under the said sub-pixel.

10. The pixel array as claimed in claim 5, wherein each data line of the fifth group after circling around a corresponding sub-pixel in the first sub-pixel row goes along the right side of another corresponding sub-pixel in the second sub-pixel row, circling both rightward and leftward around yet another corresponding sub-pixel in the third sub-pixel row.

11. The pixel array as claimed in claim 5, wherein each data line of the sixth group starts from over a corresponding sub-pixel in the first sub-pixel row and circles rightward under the said sub-pixel, continuing going along the left side of another corresponding sub-pixel in the second sub-pixel row and circling rightward under the sub-pixel, going further the left side of yet another corresponding sub-pixel in the third sub-pixel row and circling leftward under the said sub-pixel.

12. The pixel array as claimed in claim 5, wherein the data lines are parallel to one another and perpendicular to the first and the second scan lines.

13. A display panel, comprising the pixel array as claimed in claim 1.

14. A display panel, comprising the pixel array as claimed in claim 5.

* * * * *